United States Patent

Lehman

[15] 3,667,550

[45] *June 6, 1972

[54] LISTER-CHISEL COMBINATION

[72] Inventor: Charles L. Lehman, Route 3, P.O. Box 53, Corpus Christi, Tex. 78415

[*] Notice: The portion of the term of this patent subsequent to Jan. 12, 1988, has been disclaimed.

[22] Filed: Oct. 22, 1969

[21] Appl. No.: 868,556

Related U.S. Application Data

[63] Continuation-in-part of Ser. No. 703,977, Feb. 8, 1968, Pat. No. 3,554,296.

[52] U.S. Cl. ........................................... 172/700, 172/722
[51] Int. Cl. ................................. A01b 13/08, A01b 39/20
[58] Field of Search ............. 172/700, 699, 772, 749, 744, 172/722; 37/193

[56] References Cited

UNITED STATES PATENTS

| 21,975 | 11/1858 | Mahen | 172/700 |
| 63,151 | 3/1867 | Fowler | 172/700 X |
| 106,192 | 8/1870 | Murfee | 172/700 |
| 152,201 | 6/1874 | Warinner | 172/700 X |
| 229,455 | 6/1880 | Percefull | 172/700 |
| 607,207 | 7/1898 | Ankarstolpe | 172/722 X |
| 1,699,912 | 1/1929 | Palmerston | 37/193 |
| 3,554,296 | 1/1971 | Lehman | 172/700 |

FOREIGN PATENTS OR APPLICATIONS

| 678,671 | 6/1939 | Germany | 172/700 |
| 1,098,749 | 8/1955 | France | 172/700 |

*Primary Examiner*—Robert E. Pulfrey
*Assistant Examiner*—Stephen C. Pellegrino
*Attorney*—Hyer, Eickenroht & Thompson

[57] ABSTRACT

A plurality of chisels are supported in spaced-apart locations along a laterally extending tool bar which is adapted to be moved forwardly over the ground level. Each chisel has a forwardly extending point at its lower end for penetrating the soil to form a narrow trench therein as the tool bar moves forwardly. A lister is mounted on each chisel to dispose its lower cutting edges in position to sever the soil above the lower end of the chisel point and turn it onto beds on opposite sides of the trench.

3 Claims, 6 Drawing Figures

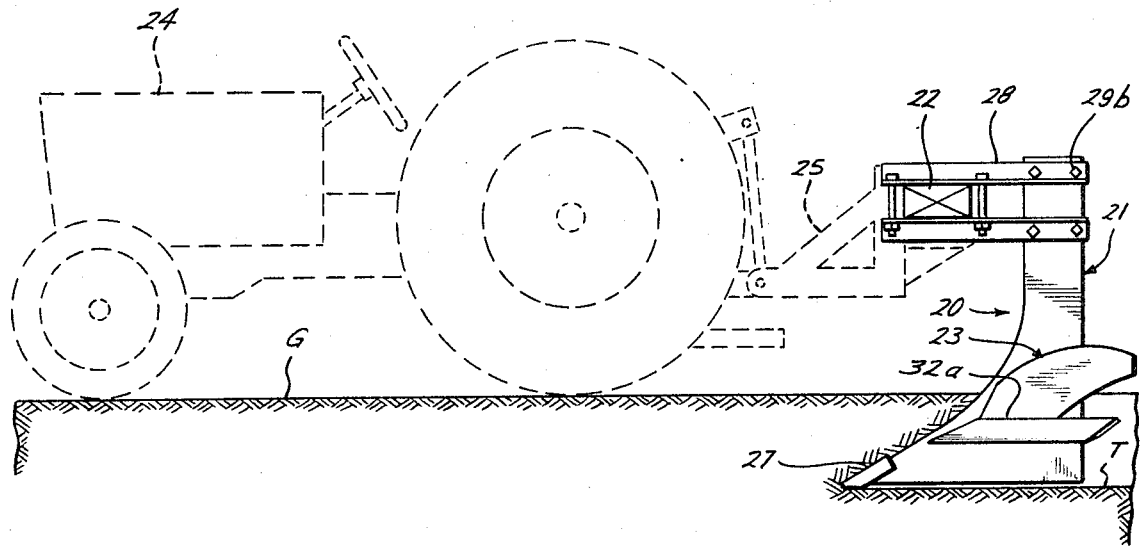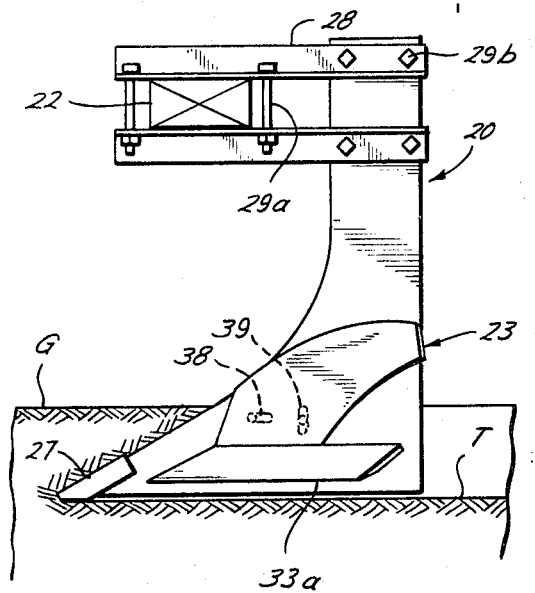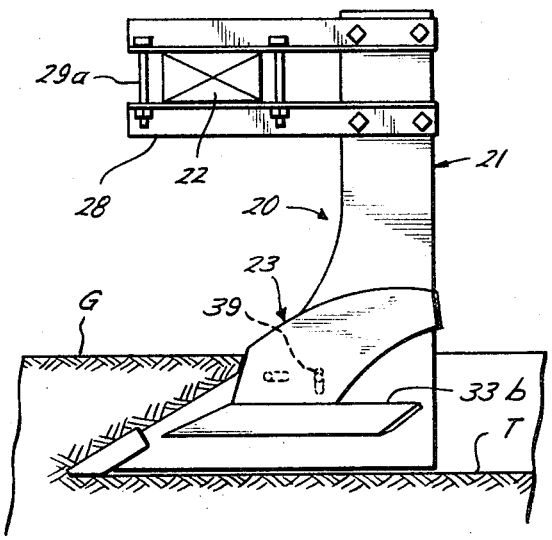

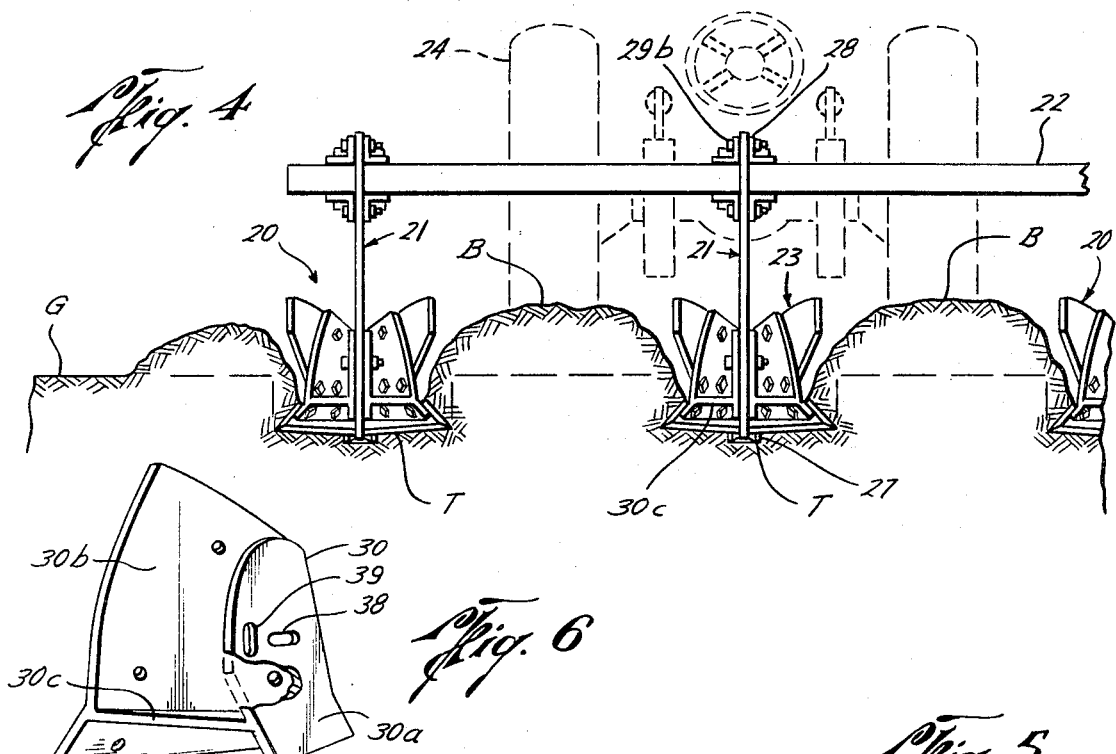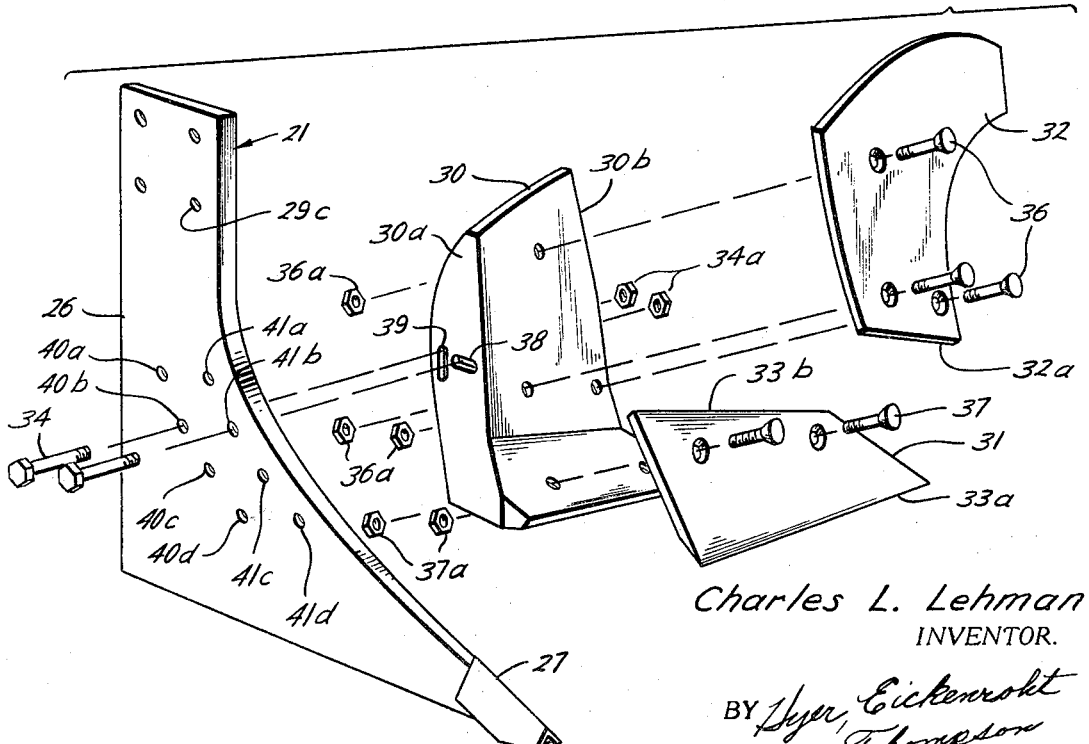

LISTER-CHISEL COMBINATION

This invention relates to improvements in lister-chisel combinations of the type disclosed in my prior application, Ser. No. 703,977, filed Feb. 8, 1968, now U.S. Pat. No. 3,554,296, and entitled "Lister-Chisel Combination". This application is a continuation-in-part of such prior application.

After a crop is harvested, its stalks are cut and its roots removed in order to prepare the soil for planting of the next crop. A farm implement commonly used to remove the roots and prepare new beds, and known as a lister or buster, comprises blades which are arranged as a "V", much like a plow. As the lister is pulled forwardly along the length of a row by means of a tractor, the apex of the "V" penetrates the soil to a relatively shallow depth to permit the cutting edges on the lower edges of the blades to sever the soil beneath the roots, and the blades turn this soil onto the beds on opposite sides of the row. Obviously, several of these listers may be mounted from and pulled by the tractor for working different rows.

The soil beneath the level of normal cultivation is often so compacted that moisture cannot penetrate it. Thus, it may be desirable to cut through this "hard pan" with an implement known as a chisel or subsoiler, and comprising a heavy forging having a shank which is relatively narrow from front to back. The upper end of the shank is mounted on a tool bar or the like adapted to be towed by a tractor, and there is a "point" on the lower end of the front of the shank. Due to the weight and shape of the chisel, this point will penetrate the soil and form a relatively deep trench beneath the hard pan. Similar to the listers, several of these chisels may be mounted in spaced-apart relation across the tool bar so as to simultaneously form trenches along several rows.

Since they must follow the same paths, it has heretofore been the practice to use the listers and chisels in separate traverses or runs of the rows. This is not only time consuming, but also requires two separate implements. Also, and depending on the horsepower available, it is often necessary to run the listers over the rows several times in order to loosen the soil to the desired depth. Furthermore, due to their narrow configurations, chisels are susceptible to considerable side draft.

In my prior application, I disclose a lister-chisel combination for performing the function of both a lister and a chisel in a single traverse or run. Although such a combination is relatively stable, it would nevertheless be desirable to further reduce its tendency toward side draft. It would also be desirable, with an implement of this type, to be able to remove the roots of very deep planted crops.

An object of this invention is to provide a lister-chisel combination of the type above described which is even more stable than the combination of my prior application.

Another object is to provide such a lister-chisel combination which is especially well suited for removing the roots of relatively deep planted crops.

Still another object is to provide a chisel of such construction as to minimize side draft.

These and other objects are accomplished, in accordance with the illustrated embodiment of this invention, by a lister-chisel combination comprising, as in my prior application, a tool bar, a plurality of chisels adapted to be supported in spaced-apart relation along the length of the tool bar, and a plurality of listers each adapted to be mounted on a chisel with its cutting edges above the lower end of the point on the front end of the chisel. More particularly, and also disclosed in my prior application, each lister is so mounted on the chisel that its elevation may be adjusted to dispose its cutting edges at selected levels above the lower end of the point. In this manner, the lister-chisel combination may be used to cultivate either relatively deep or shallow planted crops.

In accordance with the novel aspects of this particular invention, the rear edge of the lower portion of the chisel extends downwardly to intersect with the lower edge thereof at approximately a right angle to provide the chisel with a boot or heel which reduces its tendency to side draft, and thereby increases the lateral stability of the lister-chisel combination. In accordance with another novel aspect of the present invention, the lister is, as in my prior application, made up of a pair of lister halves each separately attachable to a side of the chisel for diverging rearwardly therefrom. More particularly, the means for attaching each lister half includes means for adjusting the elevation of the cutting edges of the lister halves so as to dispose them at selected positions above the lower end of the point including a lowermost position in which the cutting edge is disposed below the upper end of the point. In this manner, the lister-chisel combination can be used in removing the roots of very deep planted crops.

In the drawings, wherein like reference characters are used throughout to designate like parts:

FIG. 1 is a side view of a lister-chisel combination constructed in accordance with the present invention, and mounted upon a tool bar adapted to be towed from left to right by a tractor which is shown in broken lines;

FIG. 2 is a side view of the lister-chisel combination, similar to FIG. 1, but in which the lister halves have been moved to their lowermost positions relative to the vertical length of the chisel;

FIG. 3 is another side view of the lister-chisel combination, similar to FIG. 2, but in which the lister halves have been moved to a level intermediate the positions shown in FIG. 1 and FIG. 2;

FIG. 4 is a rear view of the lister-chisel combination;

FIG. 5 is an exploded view, in perspective, of the chisel and one of the lister halves attachable to a side of the chisel; and FIG. 6 is a perspective view of the bracket for mounting the shear blade and mold board of each lister half on the side of the chisel.

With reference now to the details of the above-described drawings, the over-all farm implement which is shown in each of FIGS. 1–4, and designated in its entirety by reference character 20, comprises one or more chisels 21 supported from a tool bar 22 in position to penetrate the soil and form a trench T beneath the ground level G as the tool bar is towed forwardly (from right to left as seen in FIGS. 1–3) by means of a tractor 24. A lister assembly 23 is mounted on each chisel above the lower end of the chisel so as to sever the soil above the lower end of the trench and turn it onto beds B (see FIG. 4) on opposite sides of each furrow through which the chisel is drawn.

As well known in the art, the tractor may have a three-point hitch 25 or similar means for raising and lowering the tool bar 22, and thus the implement 20 supported therefrom. As can be seen from FIGS. 1 – 4, the tool bar extends laterally of the direction of movement of the tractor and, as illustrated in FIG. 4, is of such length that the chisels and lister assemblies may be spaced along it for working several rows.

As best shown in FIGS. 4 and 5, the chisel 21 is of conventional construction in that it comprises a heavy forged bar which is relatively narrow from front to rear to form a correspondingly narrow trench T. Also, the upper portion of the chisel provides a shank 26 by which it is supported from the tool bar 22 in the manner to be described hereinafter, and the lower portion of the front edge of the chisel tampers forwardly and downwardly from the shank to a point 27 at the intersection of the front edge with the lower edge of the chisel.

The point 27 is also of conventional construction in that it comprises a separate member of highly wear-resistant material adapted to be removably secured to the front of the lower portion of the chisel, as illustrated. In this way, the point leads the remainder of the chisel and bears the brunt of the wear on the chisel. Preferably, and as shown, the shank and tapered lower portion of the front edge of the chisel intersect along a large radius curve.

The rear edge of the lower portion of the chisel extends downwardly from the shank to intersect with its lower edge at approximately a right angle. This forms a boot or heel at the rear of the lower portion of the chisel opposite the point 27, so as to reduce to a minimum the tendency for side draft. Preferably, the lower edge of the chisel is straight and interrupted from front to back and just above the lower end of the point.

The upper end of the shank is supported from the tool bar 22 in any suitable manner for disposing the chisel in substantially upright position with its lower edge substantially parallel to ground level. For this purpose, and as illustrated in FIGS. 1 – 4, angles 28 extend along opposite sides of the chisel shank and above and below the tool bar 22, with the upper angles being connected to the lower angles by bolts 29a extending vertically by opposite ends of the tool bar, and with the upper and lower angles being connected to one another by bolts 29b extending horizontally through holes 29c (see FIG. 5) in the chisel shank.

As previously described, and as shown in the drawings, each lister assembly 23 preferably comprises a pair of lister halves each of which is adapted to be attached to an opposite side of the chisel 21. In any event, the lower cutting edges 33a of the lister assembly, and thus the cutting edge of each lister half, are above the lower end of the point 27 in each of its positions on the chisel. More particularly, and as illustrated by a comparison of FIGS. 1, 2 and 3, each lister assembly is adjustably mounted along the vertical length of the chisel to permit its cutting edges to be disposed at selected levels above the point, which in turn determines the depth to which the cutting edges of the lister assembly sever the soil beneath the ground level G.

For example, with the lister assembly in its uppermost position, as shown in FIG. 2, there is relatively shallow penetration of the lister assembly for removing the roots to relatively shallow planted crops. Conversely, with the lister assembly 23 moved to its lowermost position with respect to the lower end of the point 27 of the chisel 21, as shown in FIGS. 2 and 4, there is maximum penetration of the lister assembly for removing the roots of relatively deep planted crops. In intermediate positions of the lister assembly relative to the vertical length of the chisel, as, for example, shown in FIG. 3, the lister assembly assumes median penetrating positions.

As best shown in FIG. 4, each lister half comprises a bracket 30 adapted to be attached to a side of the chisel 21, and a shear plate 31 and a mold board 32 adapted to be attached to the bracket 30 for mounting on the one side of the chisel. AS is best shown in FIG. 5, the shear plate 31 comprises a relatively thin sheet having an upper edge 33b which is parallel to the lower cutting edge 33, and a forward end which tapers downwardly from its upper to its lower edge to a point along the cutting edge. Since, as previously mentioned, the cutting edge 33a is susceptible of the most wear in the use of the lister assembly 23, the shear plate 31 is formed of a specially hardened steel, and may be replaced or repaired from time to time separately of the mold board 32, which is susceptible of less wear and thus need not be of a specially hardened steel.

The mold board 32 also comprises a relatively thin metal sheet which has a lower edge 32a abutting with the upper edge 33b of the shear plate 31. More particularly, these edges are vertically aligned with one another so that the outer face of the mold board forms an upwardly and forwardly extending continuation of the outer face of the shear plate 31. Similarly, the forward end of the mold board 32 lies substantially flush with the forward end of shear plate 31, when the two are attached to the bracket 30, and both ends are chamfered for disposal flat against the side of the chisel 21. The rear end of the mold board extends upwardly from its lower edge 32a and then flares upwardly and outwardly to form an overhang above the outer end of the upper edge 33b of the shear plate.

The bracket 30 for mounting the shear plate and mold board on each side of the chisel 21 is made up of inner and outer wings 30a and 30b, respectively, which diverge from their intersection at the front ends to form a "V". These wings are reinforced by means of a brace 30c extending laterally between their inner sides. The inner wing 30a of each bracket 30 is attached to a side of the chisel 21 by bolts 34 secured by means of nuts 34a. With the inner wing 30a so attached, its outer face lies flat against the adjacent side of the chisel 21 and the outer wing extends rearwardly therefrom at an acute angle.

As best shown in FIG. 5, the outer faces of the bracket wing 30b are formed to dispose the mold board and shear plate at the proper angle relative to one another. Thus, the wing 30b has a substantially vertically disposed upper face and a lower face which projects downwardly and outwardly therefrom. The upper face and the mold board have aligned holes therethrough to receive bolts 36 adapted to be secured by nuts 36a; and the lower face and the shear plate 31 have openings to receive bolts 37 adapted to be secured by nuts 37a. As shown in FIG. 5, the bolt holes in the mold board and shear plate are countersunk so that the heads of bolts 36 and 37 are flush with the faces of these parts.

The means for attaching the bracket 30 to a side of the chisel 21 includes holes 38 and 39 in the inner wing 30a of the bracket 30 aligned with a selected set of holes in the chisel 21. As can be seen from FIG. 5, there are four vertically spaced-apart sets of such holes 40a – 41a, 40b – 41b, 40c – 41c, and 40d – 41d, in the chisel shank. In the uppermost position of the lister half relative to the chisel, holes 38 and 39 are aligned with holes 40a and 41a, respectively, so as to receive the bolts 34 therethrough. In order to adjust the lister half to its lowermost position relative to the chisel, the bracket wing 30a is moved down to align its holes 38 and 39 with the holes 40d and 41d, respectively, whereupon the bolts 34 are extended therethrough. In the intermediate positions of the lister half, on the other hand, the holes 38 and 39 are aligned with the holes 40b and 41b or the holes 40c and 41c, respectively.

As shown in FIGS. 2 and 4, in the lowermost positions of the lister halves, the cutting edges of the shear plates are below the upper end of the point 27 and just slightly above the lower edge of the chisel. More particularly, and as shown in FIG. 5, the pairs of holes in the chisel for attaching the brackets curve along the length thereof generally parallel to the front edge of the chisel, whereby the forwardmost point of each shear plate may be disposed close to the rear end of the point.

As shown in the drawings, the hole 39 comprises a substantial vertically extending slot, which enables the nut securing the bolt 34 extending through the hole 39 to be loosened, and the bracket 30 to be swung about the horizontal axis defined by the other bolt 34 extending through hole 38. This swinging of the bracket 30 will, of course, affect the angular inclination of the cutting edge 33a of the shear plate 31, which may be necessary in maintaining the forward end of the cutting edge 33a of the shear plate 31 at an elevation lower than the rearward edge thereof, whereby the shear plate will dig into the soil in the desired manner. Thus, it will be understood that as the elevation of the tool bar 22 changes so as to raise or lower the point 27 of the chisel relative to the ground level G, the angular position of the cutting edge 33a also changes.

The other hole 38 in the wing 30a of the bracket 30 is also elongated to form a slot extending in a generally horizontal position. This may be found necessary in order to move the bolt 34 adapted to extend through the hole 38 out of the way of the nut 36a for attaching the bolt 36 extending through the hole in the forward corner of the upward face of wing 30b of the bracket 30. When the nut is then attached to this bolt 36, the bolt 34 can be swung to the desired position in the elongated slot 38 and the nut 34a tightened thereon.

In the operation of this farm implement, and as the tractor 24 moves forwardly (from left to right in FIG. 1), the hitch 25 lowers the point 27 on the chisel 21 to permit it to penetrate the soil, and thereby form a trench T through the middle of each furrow. At the same time, the cutting edges 33a of each of the shear plates 31 follow the penetration of the point 27 so as to slice the soil on each side of the trench and at a selected level above the point 27. The layer of soil which is severed by the shear plates moves upwardly over the face of the shear plate and onto the face of the mold board 32. The upwardly and outwardly curving upper end of the mold board 32 turns the severed soil outwardly onto beds B on opposite sides of the furrow and laterally outwardly from the trench T. As will be apparent from FIG. 4, soil which passes over the outer portion of shear plate 32 as well as some of the soil delivered to the mold board 32 from the shear plate 31 will pass through the gap or recess between the overhang of the mold board and the outer end of the shear plate, so that the beds B will be built up inwardly of the outer ends of the shear plates 31.

As previously described, and as will be obvious from the foregoing, the normal use of this implement will permit the simultaneous chiseling or subsoiling and bedding of one or more row crops. It will also be understood from the foregoing that the extent of the penetration of the cutting edge 33a of the shear plate 31, and thus the depth of cut, may be controlled by adjustment of the location of the lister halves along the vertical length of the chisel.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A lister-chisel combination, comprising a chisel adapted to form a relatively narrow trench in the soil as it is moved forwardly therethrough, the front edge of the lower portion of the chisel tampering forwardly and downwardly to intersection with the lower edge of the chisel, a point disposed over said intersection, a pair of lister halves each including a shear plate having a lower cutting edge and a mold board above the shear plate, and means for attaching each lister half to a side of the chisel for diverging rearwardly from positions adjacent said opposite sides, said attaching means including means for adjusting the elevation of the lister halves along the vertical length of the chisel so as to dispose the cutting edges at selected positions above the lower end of the point including a lowermost position in which said cutting edges are disposed below the upper end of the point.

2. A lister-chisel combination, comprising a chisel having an upper portion providing a shank by which it may be supported in an upright position and moved forwardly through the soil to form a narrow trench therealong, the front edge of the lower portion of the chisel tapering forwardly and downwardly from the shank to a point at its intersection with the lower edge thereof, and a lister mounted on the chisel including a pair of shear plates and mold boards above the shear plates, each diverging rearwardly from opposite sides of the chisel and with the front edges of the shear plates being disposed rearwardly of the front edge of lower portion of the chisel and the lower edges thereof being disposed above the lower edge of the chisel for severing the soil above said lower edge of the chisel and turning it onto beds on opposite sides of the trench during forward movement of the chisel, the lower edge of the chisel being straight and extending rearwardly from the point generally parallel to the lower edges of the shear plates and for a distance to dispose its rearward end rearwardly of the midportions of said chisels, at least the lower portion of said chisel being narrow and of considerably less width than said chisels.

3. A lister-chisel combination of the character defined in claim 2, wherein the chisel is a relatively heavy metal bar having a rear edge which is straight and extends downwardly to intersect said rearward end approximately a right angle to its lower edge.

* * * * *

UNITED STATES PATENT AND TRADEMARK OFFICE
CERTIFICATE OF CORRECTION

PATENT NO. : 3,667,550
DATED : June 6, 1972
INVENTOR(S) : Charles L. Lehman

It is certified that error appears in the above-identified patent and that said Letters Patent are hereby corrected as shown below:

Claim 1, line 4, change "tampering" to --tapering--.

Claim 2, line 20, change "chisels" to --shear plates--.

Column 2, line 59, change "tampers" to --tapers--.

Column 3, line 42, change "AS" to --As--.

Signed and Sealed this

First Day of December 1981

[SEAL]

Attest:

GERALD J. MOSSINGHOFF

Attesting Officer     Commissioner of Patents and Trademarks